S. ADAMS.
FLUE PLUG.
APPLICATION FILED APR. 15, 1910.
987,099.
Patented Mar. 21, 1911.
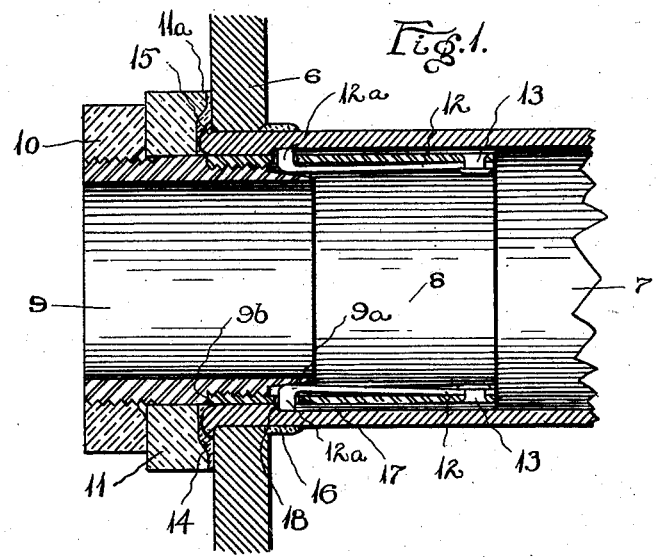
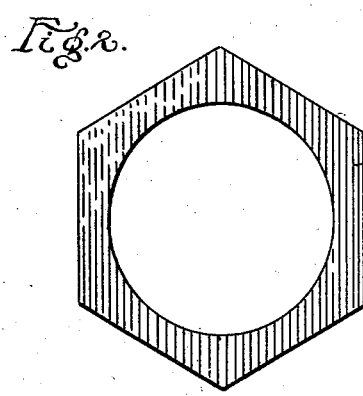
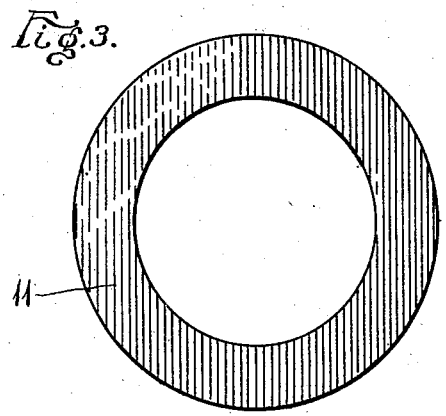
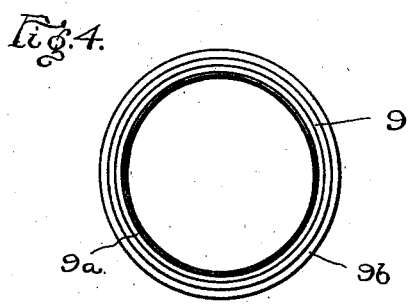
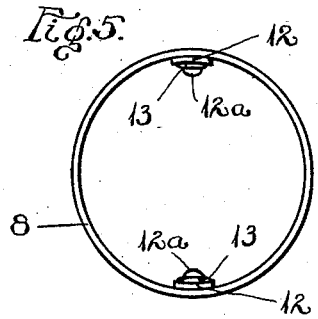
Witnesses:
Monroe E. Miller
Stedman J. Rockwell
Silas Adams, Inventor,
By Bommhardt & Co.
Attorneys.

UNITED STATES PATENT OFFICE.

SILAS ADAMS, OF CLEVELAND, OHIO.

FLUE-PLUG.

987,099. Specification of Letters Patent. Patented Mar. 21, 1911.

Application filed April 15, 1910. Serial No. 555,637.

*To all whom it may concern:*

Be it known that I, SILAS ADAMS, a citizen of the United States, residing at Cleveland, in the county of Cuyahoga and State of Ohio, have invented certain new and useful Improvements in Flue-Plugs, of which the following is a specification.

This invention relates to flue plugs or devices for preventing leaking between boiler flues and plates, and it has for its object to provide improved means for packing the flues for preventing leakage at the ends of the flues where they are fastened to the boiler plate.

The device can be used on new flues, or for repair purposes. It embodies means for clamping a washer and packing ring over the joint at the end of the flue, on the outer side thereof, to prevent the leakage referred to.

In the accompanying drawings—Figure 1 is a central longitudinal section of part of a flue and boiler plate provided with the device. Fig. 2 is a plan of a nut which clamps the parts in place. Fig. 3 is a plan of a washer. Fig. 4 is an end view of the tubular plug. Fig. 5 is an end view of a socket member which is secured within the flue.

Referring specifically to the drawings, 6 indicates the boiler plate and 7 the flue fastened thereto by the beaded end 15, with the usual copper ring 16. The flue has an inner seat or shoulder 18, as is usual with flues now in standard use, especially on locomotives.

A tubular plug 9, having a tapered inner end $9^a$, screws into the end of a sleeve or tubular socket member 8, located within the end of the flue. This sleeve has two opposite springs 12 therein, secured near its inner end by rivets 13, and these springs have at their outer ends outwardly extending fingers $12^a$ which may project through holes 17 in the sleeve 8, in position to engage the shoulder 18 when the parts are in place in the flue. The plug 9 has a shoulder $9^b$ which stops against the end of the sleeve 8 to prevent excessive inward movement.

On the outer end of the plug 9, beyond the boiler plate, is a washer 11 having on its inner face an annular rib $11^a$, and this washer is mounted to slide on the plug. A nut 10 is screwed on the threaded outer end of the plug, against the washer 11, and an asbestos or other packing ring 14 is provided between the washer and the end of the flue and the boiler plate.

In use, the plug 9 is partly screwed into the sleeve 8 before they are inserted in the flue. After being inserted, the plug is screwed in until the tapered end $9^a$ forces the fingers $12^a$ outwardly to engage the shoulder 18 in the flue. Then the nut 10 is screwed down to clamp the washer and packing in place, the pressure drawing the fingers or detents $12^a$ tightly against the shoulder 18 and holding all parts in position. A tight joint is formed between the bead 15 and the packing, as well as between the boiler plate 6 and the packing, this result being assisted by the rib $11^a$. The plug may be removed by taking off the nut 10 and unscrewing the part 9, and the spring fingers will withdraw from engagement with the shoulder of the flue and permit the sleeve and other parts to be pulled out.

It will be noticed that special construction of the flue or boiler plate is unnecessary, and hence the device may be applied to existing flues, provided they have the shoulder 18 or its equivalent, or other means provided to engage the detents to the flue.

What I claim as new is:—

1. A device for the purpose stated, comprising a socket member adapted to fit within a flue, a tubular plug screwed into said member, means carried by said member and actuated by said plug when screwed therein to hold the member in position in the flue, and packing devices mounted on the plug.

2. A device for the purpose stated, comprising a socket member adapted to fit within a flue, yielding engaging devices mounted in said member and adapted to engage the inner surface of the flue to hold said member in position in the flue, a tubular plug screwed into said member and into contact with said devices to force the same into engagement with the flue, and a packing mounted on the plug and covering the joint around the flue.

3. A device for the purpose stated, comprising a socket member adapted to fit within a flue, said member having lateral openings, spring detents attached within the said member and arranged to be advanced in said openings to engage the inner surface of the plug, a tubular plug coupled with the socket member and movable therein to advance said detents to such engagement, and packing devices mounted on the plug, against the end of the flue.

4. A device for the purpose stated, comprising a tubular sleeve adapted to fit within the end of a flue, spring detents carried by said sleeve and movable in the wall thereof to engagement with the flue to hold the sleeve therein, a tubular plug screwed into said sleeve and having a beveled inner end arranged to bear against said detents and force the same outwardly to engagement with the flue, and packing devices mounted on the plug, outside of the end of the flue.

5. The combination with a flue plate and a flue having an internal shoulder, of a sleeve fitting within the end of the flue, spring detents carried by the sleeve and movable outwardly through the wall thereof to engage said shoulder to prevent withdrawal of the sleeve, a tubular plug screwed into the sleeve and bearing at its inner end against said detents to advance the same for such engagement, and packing devices mounted on the outer end of the plug, over the joint of the flue and flue plate.

6. The combination of a flue plate and flue, a tubular threaded plug, means to hold the inner end thereof in the flue, a packing ring having an annular rib located on the plug and covering the joint between the flue and plate, the rib being presented toward the plate, and a nut on the plug, to press the ring toward the plate.

In testimony whereof, I affix my signature in the presence of two witnesses.

SILAS ADAMS.

Witnesses:
 WM. STROUP,
 MONROE E. MILLER.

---

Copies of this patent may be obtained for five cents each, by addressing the "Commissioner of Patents, Washington, D. C."